United States Patent [19]

Philipp

[11] Patent Number: 4,497,575

[45] Date of Patent: Feb. 5, 1985

[54] OPTICAL FIBER TEST INSTRUMENT CALIBRATOR

[75] Inventor: Harald Philipp, Aloha, Oreg.

[73] Assignee: Tektronix, Inc., Beaverton, Oreg.

[21] Appl. No.: 438,102

[22] Filed: Nov. 1, 1982

[51] Int. Cl.³ .................... G01N 21/84; G02B 5/14
[52] U.S. Cl. ................... 356/73.1; 350/96.15; 356/243
[58] Field of Search .......... 356/73.1, 243, 434, 356/435; 350/96.15; 324/74

[56] References Cited

U.S. PATENT DOCUMENTS

| | | | |
|---|---|---|---|
| 4,136,929 | 1/1979 | Suzaki | 350/96.15 |
| 4,167,328 | 9/1979 | Cross et al. | 356/243 X |

*Primary Examiner*—Vincent P. McGraw

*Attorney, Agent, or Firm*—John Smith-Hill

[57] ABSTRACT

An optical time domain reflectometer including a light source and a light detector is calibrated using an optical directional coupler having a first port connected to the reflectometer and second and third ports connected to two opposite ends of an optical transmission member. Light pulses from the light source are introduced into the transmission member by way of one end thereof, and reflected and backscattered light from the transmission member is detected by the light detector. The reflectometer provides a display of the time relation between light pulses generated by the light source and electrical signals generated by the light detector, and the display is utilized in conjunction with a known propagation characteristic of the optical transmission member, to calibrate the reflectometer.

9 Claims, 4 Drawing Figures

OPTICAL FIBER TEST INSTRUMENT CALIBRATOR

This invention relates to the calibration of an optical time domain reflectometer (OTDR).

Optical-fiber communication systems are becoming increasingly popular because optical fiber cables are less bulky, lighter, less expensive and more flexible than conventional metallic cables. Moreover, optical fiber cables give rise to lower transmission loss than metallic cables, and are not sensitive to external electrical and magnetic interference. Recently, OTDRs have been developed to evaluate optical fiber cables. OTDRs are optical fiber test instruments for measuring transmission loss characteristics, and detecting and locating faults in optical fibers. The gain linearity of an OTDR is preferably calibrated in order to enable quantitative measurements of loss characteristics. When measuring transmission loss characteristics of a very long optical fiber cable, the instrument gain linearity must be calibrated over the full range of input signal levels. Although a very long fiber could be used for calibrating an OTDR over a wide range, it would be very expensive, impractical and not portable for field applications. Time linearity calibration is also required for accurate time, and consequently distance, measurements.

The present invention may be used to calibrate an OTDR over the entire range of useful input signal levels without need for a bulky calibration device having a very long optical fiber. Gain and time linearity can easily be calibrated by observing revolutions of an optical pulse.

For a better understanding of the invention, and to show how the same may be carried into effect, reference will now be made, by way of example to the accompanying drawings in which.

Figure 1:
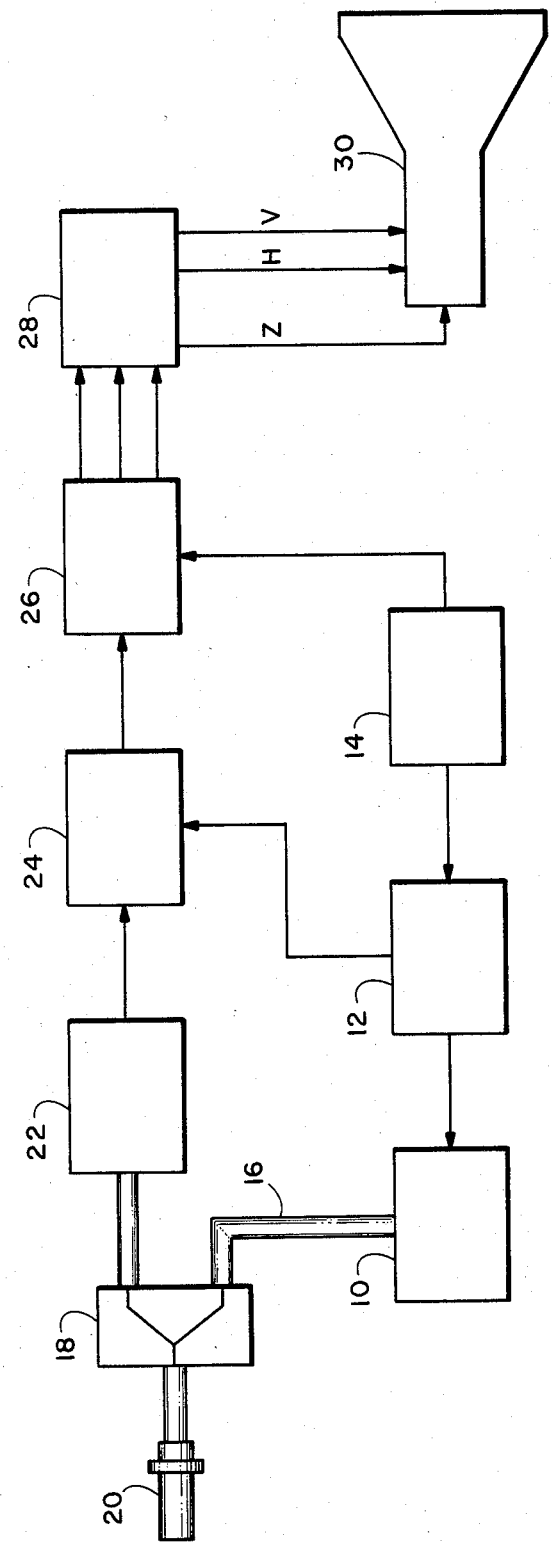
FIG. 1 is a block diagram of a conventional OTDR, for explaining the operation thereof.

The OTDR illustrated in FIG. 1 comprises an optical pulse generator 10 which generates a train of infrared light pulses at a constant repetition rate in response to electrical pulses from a delay generator 12, operating under control of a processor 14. The pulse train is transmitted through an optical fiber 16 to a three-port directional coupler 18 which directs the light pulses (incident pulses) to an optical output connector 20 and from there to an optical fiber under test (not shown). The optical connector 20 and coupler 18 partially reflect the incident pulses, and the reflected pulses are transmitted to an input stage 22, including a photodetector, a preamplifier and a logamplifier.

In each cycle of operation of the OTDR, the incident pulse enters the optical fiber under test at one end and travels through the fiber in one direction (hereinafter the "forward direction") and is reflected in the opposite direction (hereinafter the "reverse direction") from discontinuities in the optical transmission path of the fiber, such as fault locations and the other end of the optical fiber. Rayleigh scattering in the fiber as the outgoing pulse travels through the fiber gives rise to a relatively weak and continuous light signal traveling in the reverse direction. Such back scattering (BS) signal decays exponentially with the distance of travel of the outgoing pulse. The BS signal is used to measure the transmission loss characteristic of an optical fiber with an OTDR.

The reflection pulse and the BS signal (referred to collectively hereinafter as the "reflection signal") are transmitted in the reverse direction to the output connector 20 and are directed by the directional coupler 18 to the input stage 22, which converts the reflection signal into an electrical signal and logarithmically amplifies the electrical signal. The logarithmically compressed signal is applied to a sampler 24, including an analog-to-digital converter (ADC), where the instantaneous amplitude at one point of the signal, determined by a delay generator 12 operating under control of the processor, is converted into digital form. The digital signal is stored by a display memory 26, which includes a display controller. In the next cycle of operation of the OTDR, the instantaneous amplitude of the logarithmically compressed signal at a later point, determined by the delay generator, is digitized and stored. This process is repeated for as many cycles as is necessary to collect enough samples to reconstruct the logarithmically compressed signal. The data stored in the display memory 26 is then continuously read by the display controller, converted to an analog signal, and applied to a vertical deflection amplifier in a deflection amplifier circuit 28. The display controller also generates a corresponding ramp waveform signal for horizontal deflection, and a blanking signal for retrace beam blanking, which signals are also applied to the deflection amplifier circuit 28. The deflection amplifier circuit 28 applies vertical, horizontal and Z-axis signals to a cathode ray tube (CRT) 30 for displaying the waveform of the reflection signal on the CRT screen.

Figure 2:
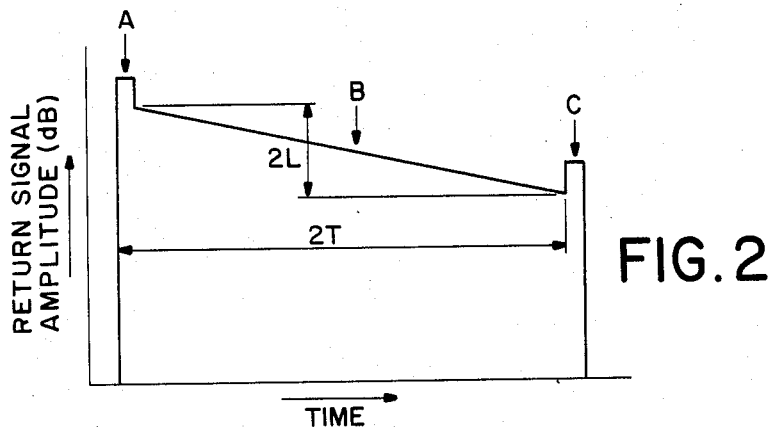
FIG. 2 shows the waveform that is displayed by an OTDR when testing an optical fiber.

FIG. 2 shows the waveform that is displayed on the screen of the CRT when testing an optical fiber cable which is free of fault locations. The vertical and horizontal axes represent respectively signal amplitude and time. The reference letters A, B and C represent respectively the first reflection pulse (obtained by partial reflection in the coupler 18 and connector 20 of the incident pulse generated by the optical pulse generator 10), the BS signal and the reflection pulse orginating from the far end of the fiber cable. The interval between emission of the incident pulse and receipt of the first reflection pulse is, for present purposes, negligible, and accordingly the first reflection pulse, for practical purposes, coincides with the incident pulse. The amplitude of the first reflection pulse, represented by the amplitude of the pulse A, is much less than the amplitude of the incident light pulse itself, owing to the partial reflection in the coupler 18 and connector 20. As mentioned previously, the BS signal decays exponentially with time (or the distance of travel of the outgoing pulse). However, since the electrical signal is logarithmically amplified by the logamplifier in the input stage 22 for ease of reading attenuation and also increasing the dynamic range, the trace of the BS signal slopes down linearly as shown in FIG. 2 and the graticule of the CRT is graduated in the vertical direction in dBs. Attenuation in dBs between any two points of the waveform on the CRT screen can be measured directly from the vertical distance between the two points.

If the fiber transmission loss of the optical fiber under test is L dB, the vertical distance between the two ends of the sloping trace B must be 2L because the reflection signal makes a return trip in the optical fiber. Unless the vertical distance measured on the CRT screen between the ends of the trace B is equal to 2L, the vertical deflection amplifier must be adjusted to correct the error.

The graticule of the CRT is graduated in the horizontal direction in units of time. The propagation time of the incidence pulse and the reflection pulse C is proportional to the length of the optical fiber. If the propagation velocity and the length of the optical fiber are known, the propagation time thereof can be calculated. Assuming that the one-way propagation time of the optical fiber is T, the interval between the leading edge of the incident pulse (coinciding with the leading edge of the first reflection pulse A) and the leading edge of the reflection pulse C is equal to 2T. Unless the horizontal distance measured on the screen of the CRT between the leading edges of the pulses A and C corresponds to the time 2T, the horizontal deflection amplifier must be adjusted to correct the error.

The linearity of the sloping trace B displayed on the screen depends on several factors including the gain linearity of the logamplifier in the input stage 22, the time linearity of the horizontal amplifier in the deflection circuit 28 and uniformity of the intensity of backscattering along the optical fiber cable. It is difficult to recognize which factor is responsible for nonlinearity of the displayed sloping trace. The gain and time linearity calibration is not easy. If the time linearity is correct and the scattering is uniform along the fiber cable, the gain linearity of the logamplifier can be calibrated. However, the optical fiber must be very long in order to calibrate the gain linearity over the full range of signal levels.

Figure 3:
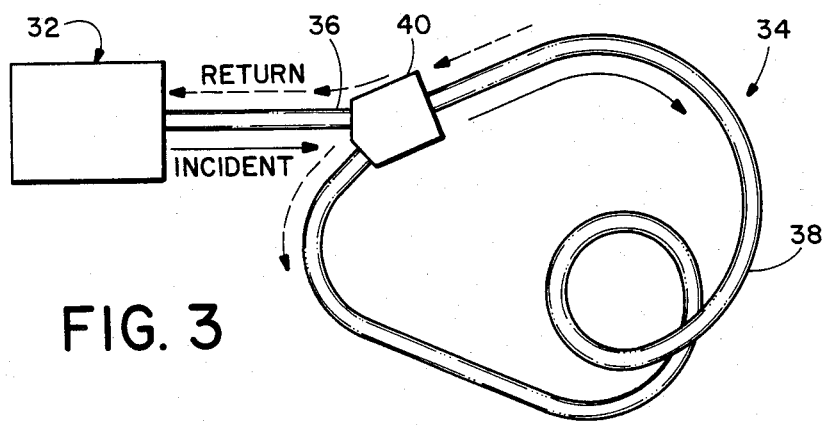
FIG. 3 illustrates diagrammatically a calibration device embodying the present invention.

FIG. 3 shows a calibration device 34 which includes optical fibers 36 and 38 and a three-port directional coupler 40. One end of the optical fiber 36 is connected to the output connector 20 of the OTDR 32 and the other end thereof is connected to the first port of the directional coupler 40. The two ends of the optical fiber 38 are connected to the second and third ports respectively of the directional coupler 40. When the incident pulse passes through the coupler 40, a reflection pulse (referred to as the "second reflection pulse") is generated as a result of discontinuities in the coupler and is transmitted back to the OTDR 32 by the fiber 36. The directional coupler 40 permits the incident pulse received from the fiber 36 to pass only to the second port of the coupler. As the incident pulse travels along the fiber 38 in the forward direction, a backscattering signal traveling in the reverse direction is generated. The backscattering signal is divided by the coupler 40 into a direct BS signal which is transmitted to the fiber 36 by the coupler 40 and thence to the OTDR 32, and an indirect BS signal which is coupled into the fiber 38 by way of the third port and passes through the fiber 38 in the reverse direction before being partially transmitted to the fiber 36 by the coupler. When the incident pulse reaches the third port of the coupler, it is coupled back into the fiber 38 by way of the second port. Simultaneously, two reflection pulses are generated as a result of discontinuities in the coupler. One of these reflection pulses, referred to as the "direct pulse", is transmitted directly to the OTDR 32 by the coupler 40 and the fiber 36 without passing through the fiber 38. The other reflection pulse, referred to as the "indirect pulse", passes through the fiber 38 in the reverse direction before being transmitted to the OTDR. As the incident pulse recirculates through the fiber 38, a backscatter signal is continuously generated and two reflection pulses (referred to as "subsequent reflection pulses") are generated at each pass through the coupler 40. The incident pulse suffers a loss of energy on each pass through the coupler 40. In addition, the incident pulse is continuously attenuated, and therefore the power of the subsequent reflection pulses and of the backscatter signal is also attenuated.

Figure 4:
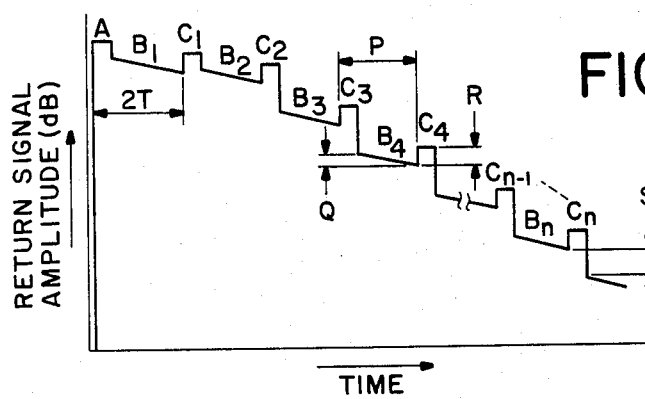
FIG. 4 shows the waveform that is displayed by an OTDR when being calibrated using the calibration device of FIG. 3.

FIG. 4 shows the reflection signal waveform displayed on the CRT screen when the calibration device 34 is connected to OTDR 32. Pulse A is the first reflection pulse (coinciding with the emission of the incident pulse), pulses $C_1$ through $C_n$ are reflection pulses originating from the coupler 40, i.e., the second reflection pulse and the subsequent reflection pulses, and sloping traces $B_1$ through $B_n$ are backscattering signals. If the propagation time through the optical fiber 36 is T, the second reflection pulse $C_1$ will be detected at time 2T. If the propagation time for one revolution through the optical fiber 38 (the loop delay) is P, and it is assumed that the propagation time through the coupler 40 is negligible in comparison to T and P, the first direct pulse will be detected at time $2T+P$ following detection of the first reflection pulse A at time 0 and successive direct pulses will be detected after intervals of duration P. The first indirect pulse will be detected at time $2T+2P$ (i.e., at the same time as the second direct pulse) and successive indirect pulses will be detected after intervals of duration P. Thus, the second and successive direct pulses will be detected simultaneously with the first and successive indirect pulses. It will thus be appreciated that the pulse $C_2$ shown in FIG. 4 is the first direct pulse and that each succeeding pulse $C_3$ to $C_n$ is a direct pulse and an indirect pulse detected simultaneously therewith.

During the interval between detection of the first reflection pulse A and detection of the second reflection pulse $C_1$, the OTDR receives the backscatter signal arising from passage of the incident pulse through the fiber 36, represented by the trace $B_1$. During the interval between detection of the pulses $C_1$ and $C_2$, the OTDR receives the backscatter signal arising from passage of the incident pulse through the fiber 38. At the time of detection of the first direct pulse $(2T+P)$, the backscatter signal that is detected is the direct BS signal which originates from a point that is $V(2T+P)/2$ distant from the OTDR, where V is the propagation velocity in the fibers 36 and 38 (assumed to be equal), i.e., a point that is half-way around the loop formed by the fiber 38. As the incident pulse passes through the fiber 38, on its second revolution, a second direct backscattering signal will be superimposed on the direct backscattering signal arising from the incident pulse's first passage through the fiber 38. An indirect backscattering signal is also received while the incident pulse passes through the fiber 38 on its second revolution. Accordingly, the sloping trace $B_2$ represents the backscattering signal generated by passage of the incident pulse to the point half-way along the fiber 38 on its first revolution, whereas subsequent traces $B_3$ to $B_n$ represent the sum of two direct backscattering signals generated by the incident pulse on two consecutive revolution and an indirect backscattering signal generated on the previous revolution of the incident pulse.

The horizontal distance between the leading edges of successive reflection pulses $C_1$ to $C_n$ is dependent on the loop delay P, which is constant. The vertical distance between the opposite ends of each sloping trace $B_3$ to $B_n$ is dependent on the transmission loss Q of the optical fiber 38, which also is a constant. The vertical distance between the lower end of each sloping trace $B_3$ to $B_n$ and the top of the reflection pulse adjacent the lower end of the sloping trace is dependent on the reflection height R of the directional coupler 40 and also is a constant. The vertical distance between the peaks of adjacent pulses $C_3$ to $C_n$ is also constant. Finally, the step loss S in the coupler 40 is a constant and is represented by the vertical distance between the adjacent ends of neighboring traces $B_3$ to $B_n$. These relationships enable the OTDR 32 to be calibrated using the calibration device 34.

In calibrating the OTDR 32, the vertical amplifier is adjusted so that the vertical distance between the opposite ends of each sloping trace $B_3$ to $B_n$ measured in dB is equal to the known fiber loss Q of the optical fiber 38, and the horizontal amplifier is adjusted so that horizontal distance between the leading edges of successive pulses $C_1$ to $C_n$ measured in units of time is equal to the known propagation time P of the optical fiber 38. If the vertical distance between the ends of a trace $B_i$, measured in dB, cannot be made equal to Q when the distance between the leading edges of the reflection pulses $C_{i-1}$ and $C_i$ is equal to P, gain nonlinearity to the power level of the trace $B_i$ is indicated. Similarly, if the distance between the leading edges of the pulses $C_{i-1}$ and $C_i$ cannot be made equal to P when the vertical distance between the ends of the trace $B_i$ is equal to Q, time nonlinearity is indicated. Accordingly, the calibration device is capable of individually recognizing gain nonlinearity and time nonlinearity. The gain linearity is calibrated by adjusting the logamplifier, and the time linearity is calibrated by changing the delays in the delay generator 12 or adjusting the ramp generator of the display controller. The linearities may be calibrated by preparing a calibration table. The reflection height R and the step loss S serve for analyzing the characteristics of the directional coupler 40.

It will be appreciated that the invention is not restricted to the particular calibration device and method which have been described, since variations may be made therein without departing from the scope of the invention as defined in the appended claims, and equivalents thereof. For example, it is not essential to use the fiber loss Q when calibrating the gain linearity. Any of the other vertical measures which are constant could alternatively be used.

I claim:

1. A calibration device, for calibrating an optical time domain reflectometer of the type comprising a light source for generating pulses of light, a light detector for generating electrical signals in response to light received thereby, an optical coupler for coupling the light source and the light detector to one end of an optical fiber whereby light pulses from the light source are introduced into the optical fiber by way of said one end and electrical signals are generated by the light detector in response to light leaving the optical fiber by way of said one end, and display means for providing a display of the time relation between light pulses generated by the light source and electrical signals generated by the light detector, the calibration device comprising:

a first optical transmission member having two opposite ends, one of which is connected, in use, to the coupler of the reflectometer to be tested;

optical directional coupling means having at least first, second and third ports and being connected by way of its first port to the other of said two opposite ends of the first optical transmission member, the coupling means directing light received by way of the first port to the second port but not substantially to the third port, dividing light received by way of the second port and directing it to the third port and to the first port, and directing light received by way of the third port to the second port; and a second optical transmission member having a known propagation characteristic and having two opposite ends connected respectively to the second and third ports of the coupling means.

whereby the nature of the display provided by the display means of the reflectometer when the reflectometer is operative and is connected to the calibration device can be utilized, in conjunction with the known propagation characteristic of the second optical transmission member, to calibrate the reflectometer.

2. A device according to claim 1, wherein the known propagation characteristic is the propagation time.

3. A device according to claim 1, wherein the known propagation characteristic is the propagation loss.

4. In combination:

an optical time domain reflectometer of the type comprising a light source for generating pulses of light, a light detector for generating electrical signals in response to light received thereby, an optical coupler for coupling the light source and the light detector to one end of an optical fiber, whereby light pulses from the light source are introduced into the optical fiber by way of said one end and electrical signals are generated by the light detector in response to light leaving the optical fiber by way of said one end, and display means for providing a display of the time relation between light pulses generated by the light source and electrical signals generated by the light detector; and a calibration device comprising an optical directional coupling means having at least first, second and third ports and connected by way of its first port to the coupler of the reflectometer, the coupling means directing light received by way of the third port to the second port, and an optical transmission member of having a known propagation characteristic and having two opposite ends connected respectively to the second and third ports of the coupling means, whereby the nature of the display provided by the display means of the reflectometer when the combination is in use can be utilized, in conjunction with the known propagation characteristic of the optical transmission member, to calibrate the reflectometer.

5. A combination according to claim 4, wherein the known propagation characteristic is the propagation time.

6. A combination according to claim 4, wherein the known propagation characteristic is the propagation loss.

7. A method of calibrating an optical time domain reflectometer of the type comprising a light source for generating pulses of light, a light detector for generating electrical signals in response to light received thereby, an optical coupler for coupling the light source and the light detector to one end of an optical fiber, whereby light pulses from the light source are introduced into the optical fiber by way of said one end and electrical signals are generated by the light detector in response to light leaving the optical fiber by way of said one end, and display means for providing a display of the time relation between light pulses generated by the light source and electrical signals generated by the light detector, said method comprising:

connecting optical directional coupling means having a least first, second, and third ports to the coupler of the reflectometer by way of said first port, the coupling means directing light received by way of the first port to the second port but not substantially to the third port, dividing light received by way of the second port and directing it to the third port and to the first port, and directing light received by way of the third port to the second port;

connecting two opposite ends of an optical transmission member having a known propagation characteristic to the second and third ports respectively of the coupling means; and utilizing the display provided by the display means of the reflectometer, in conjunction with the known propagation characteristic of the optical transmission member, to calibrate the reflectometer.

8. A method according to claim 7, wherein the known propagation characteristic is the propagation time.

9. A method according to claim 7, wherein the known propagation characteristic is the propagation loss.

* * * * *